United States Patent [19]
Schmidt et al.

[11] Patent Number: 5,959,016
[45] Date of Patent: Sep. 28, 1999

[54] COMPOSITION FOR PREPARING A SOLVENT-RESISTANT COATING

[75] Inventors: Donald L. Schmidt; Robert D. Mussell, both of Midland, Mich.

[73] Assignee: The Dow Chemical Company, Midland, Mich.

[21] Appl. No.: 08/904,087

[22] Filed: Jul. 31, 1997

[51] Int. Cl.⁶ ...................................................... C08K 3/00
[52] U.S. Cl. ...................... 524/399; 524/555; 526/292.95
[58] Field of Search ................................... 524/555, 399; 526/292.95

[56] References Cited

U.S. PATENT DOCUMENTS

| | | |
|---|---|---|
| 3,947,396 | 3/1976 | Kangas et al. . |
| 4,140,664 | 2/1979 | Mizuguchi et al. . |
| 4,544,697 | 10/1985 | Pickelman et al. . |
| 4,544,723 | 10/1985 | Upson et al. . |
| 4,582,663 | 4/1986 | Pickelman et al. . |
| 4,622,360 | 11/1986 | Gomi et al. . |
| 4,704,324 | 11/1987 | Davis et al. . |
| 4,783,224 | 11/1988 | Sako et al. . |
| 4,784,789 | 11/1988 | Jeschke et al. . |
| 4,814,101 | 3/1989 | Schieferstein et al. . |
| 4,859,384 | 8/1989 | Fibiger et al. . |
| 4,929,666 | 5/1990 | Schmidt et al. . |
| 5,013,769 | 5/1991 | Murray et al. . |
| 5,075,399 | 12/1991 | Ahmed et al. . |
| 5,116,921 | 5/1992 | Hsieh . |
| 5,130,389 | 7/1992 | Ahmed et al. . |
| 5,216,098 | 6/1993 | Ahmed et al. . |
| 5,252,692 | 10/1993 | Lovy et al. . |
| 5,310,581 | 5/1994 | Schmidt et al. . |
| 5,354,481 | 10/1994 | Neff et al. . |
| 5,354,806 | 10/1994 | Hsieh . |
| 5,464,538 | 11/1995 | Schmidt et al. . |
| 5,470,908 | 11/1995 | Schmidt et al. . |
| 5,527,853 | 6/1996 | Landy et al. . |
| 5,578,598 | 11/1996 | Abe et al. . |
| 5,580,650 | 12/1996 | Forgach et al. . |

FOREIGN PATENT DOCUMENTS 0 000 426  6/1978  European Pat. Off. .

OTHER PUBLICATIONS

Chemical Reg. No. 45076–54–8.
Chemical Reg. No. 51441–64–6.
Chemical Reg. No. 63810–34–4.
Chemical Reg. No. 73082–48–1.
Chemical Reg. No. 82667–45–6.
Chemical Reg. No. 93926–67–1.
Chemical Reg. No. 122988–32–3.
Chemical Reg. No. 145425–78–1.
Chemical Reg. No. 149186–03–8.
Chemical Reg. No. 151938–12–4.
Chemical Reg. No. 166740–88–1.
Van Dyk, John W., et al., Ind. Eng. Chem. Prod. Res. Dev., vol. 24, pp. 473–477 (1985).
Daniels, E. S., et al., Progress in Organic Coatings, vol. 19, pp. 359–378 (1991).
Hansen, Charles M. J. Paint Technology, vol. 39, No. 511, pp. 505–510 (Aug. 1967).
Kötz, J., et al., Acta Polymer, vol. 43, pp. 193–198 (1992).
Ooka, M., et al., Progress in Organic Coatings, vol. 23, pp. 325–338 (1994).
Padget, J. C., Journal of Coatings Technology, vol. 65, No. 839, pp. 89–105 (Dec. 1994).
Shalbayeva, G. B., et al., Polymer Science U.S.S.R., vol. 26, No. 6, pp. 1421–1427 (1984).

*Primary Examiner*—Edward J. Cain

[57] ABSTRACT

A water-based polymer composition containing a polyvalent metal complex and a polymer having pendant strong cationic groups and weak acid salt groups forms fast dry-to-the-touch coatings that are resistant to water and many organic solvents. These coatings can be removed with ammonia-containing solvents.

24 Claims, No Drawings

COMPOSITION FOR PREPARING A SOLVENT-RESISTANT COATING

BACKGROUND OF THE INVENTION

The present invention relates to a water-based polymeric composition that can be used to prepare a dust-free, tack-free, solvent-resistant coating.

Coatings provide protective barriers for a variety of things including floors, automobiles, exteriors and interiors of houses, and human skin. Protective coatings for floors, for example, have been known since the mid 1950s. Many of the early coating materials were applied using petroleum- or naphthene-based solvents and as such, were undesirable due to the toxicity and flammability of these solvents.

Water-based synthetic emulsion compositions, such as styrene resin emulsions, styrene-acrylate copolymer resin emulsions, and acrylate emulsions, developed in the early 1960s, gradually replaced organic solvent-based compositions. Although these water-based compositions are less toxic and more environmentally friendly than organic solvent-based compositions, the water-based compositions tend to be slow to become tack-free and dust-free.

Removable, water-based coatings are known. For example, polymers that contain ammonium carboxylate functionality are water compatible, but become incompatible through the loss of solvent and ammonia.

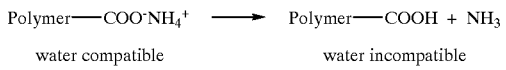

water compatible      water incompatible

Coatings made by the above-illustrated process can be subsequently removed by contact with an aqueous alkaline liquid, which converts the acid back into the water-compatible salt.

For example, in U.S. Pat. No. 4,622,360, Gomi et al. discloses a removable water-borne polyurethane resin containing carboxyl groups. Coating compositions can be prepared by adding a polyvalent complex-forming metal to the water-borne resin. The polyvalent metal forms a stable water-dispersible complex with the resin in the aqueous solution. When the dispersion is applied to a floor surface, volatile materials evaporate to allow the polyvalent metal ions to initiate a crosslinking of two or more carboxyl groups, thereby forming a hardened, water-incompatible coating that dries in about 30 minutes. This hardened coating can be removed with an alkaline remover solution containing, for example, potassium oleate and ammonia.

The ammonium carboxylate coating that contains the polyvalent metal is water-resistant as compared to the coating that does not contain the metal. Nevertheless, the coating takes about 30 minutes to dry. It would be an advantage to prepare a water- and solvent-resistant coating that becomes dust-free and tack-free in less than 5 minutes.

SUMMARY OF THE INVENTION

The present invention is a composition comprising: a) a polymer having a backbone that contains pendant strong cationic groups and weak acid salt groups; b) a water-based solvent medium; and c) a polyvalent metal complex.

In a second aspect, the present invention is a composition prepared by dispersing into a water-based solvent medium: a) a polymer having a backbone that contains pendant strong cationic groups and weak acid groups; b) sufficient ammonia or an amine to convert at least a portion of the weak acid groups to salts of a weak acid; and c) a polyvalent metal complexing agent to form a polyvalent metal complex with the ammonia or amine, the amine being sufficiently volatile to spontaneously evaporate when the composition is applied as a coating to a substrate.

The composition of the present invention can form a water- and solvent-resistant film that is tack-free in less than 5 minutes.

DETAILED DESCRIPTION OF THE INVENTION

The composition of the present invention comprises a polymer having a backbone that contains strong cationic groups and weak acid salt groups, which polymer is dispersed in a water-based solvent medium along with a polyvalent metal complex.

As used herein, the terms "dispersion" or "dispersed" refer to a stable or metastable mixture of the polymer with the water-based solvent medium, and includes a solution, or a micellular or partially colloidal suspension, but not a stable aqueous dispersion (i.e., latex). As used herein, a film or coating is "dust-free" when the finger, without pressure, can be lightly run over the surface of the film without picking up a film on the finger. As used herein, a film or coating is "tack-free" when the finger with a slight pressure will not leave a mark, and the surface is not sticky. As used herein, "water-based solvent medium" refers to a solvent that contains at least 10 percent by weight water, based on the weight of total solvents, more preferably at least 20 percent by weight water, most preferably at least 40 percent by weight water.

The polymer having a backbone that contains strong cationic groups and weak acid ammonium salt groups can be formed from the polymerization of a polymerizable strong cationic monomer and a polymerizable weak acid monomer, followed by addition of ammonia to form the ammonium salt of the weak acid groups. As used herein, the term "polymerizable strong cationic monomer" refers to a monomer that contains ethylenic unsaturation and a cationic group having a charge that is independent of pH. Similarly, the term "polymerizable weak acid monomer" refers to a monomer that contains ethylenic unsaturation and a weak acid group. As used herein, the term "weak acid group" refers to an acid having a $pK_a$ in the range of from about 2 to about 7.

The term "structural units formed from the polymerization of . . . " is illustrated by the following example.

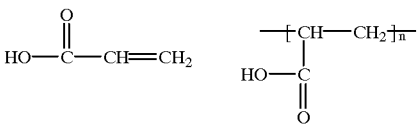

In addition to structural units formed from the polymerization of a polymerizable strong cationic monomer and a polymerizable weak acid monomer, the polymer also preferably includes structural units that can be formed from the polymerization of a polymerizable non-interfering monomer. The term "polymerizable non-interfering monomer" is used herein to refer to an uncharged monomer that does not adversely affect the formation and properties of a coating prepared from the dispersion of the polymer.

Polymerizable weak acid monomers that are suitable for the preparation of the dispersion used to prepare the dust-free and tack-free coating include ethylenically unsaturated compounds having carboxylic acid functionality. Preferred polymerizable acid monomers include acrylic acid, methacrylic acid, itaconic acid, β-carboxyethyl acrylate (usually as a mixture of acrylic acid oligomers), and vinylbenzoic acid. Acrylic acid and methacrylic acid are more preferred acid monomers.

The polymerizable strong cationic monomer is associated with a counterion, which may be, for example, halide such as chloride or bromide, nitrate, phosphate, sulfate, acetate, or hydroxide. Suitable polymerizable strong cationic monomers include salts of ethylenically unsaturated compounds having quaternary ammonium, sulfonium, cyclic sulfonium, and phosphonium functionality. Examples of suitable monomers having quaternary ammonium functionality include ethylenically unsaturated trialkylammonium salts such as vinylbenzyl tri-$C_1$–$C_4$-alkylammonium chloride or bromide; trialkylammoniumalkyl acrylates or methacrylates such as 2-[(methacryloyloxy)ethyl] trimethylammonium chloride and N,N-diethyl-N-methyl-2-[(1-oxo-2-propenyl)oxy] ethanaminium methyl sulfate (Chem. Abstracts Reg. No. 45076-54-8); and trialkylammoniumalkyl acrylamides such as N,N,N-trimethyl-3-[(2-methyl-1-oxo-2-propenyl) amino]-1-propanaminium chloride (Chem. Abstracts Reg. No. 51441-64-6) and N,N-dimethyl-N-[3-[(2-methyl-1-oxo-2-propenyl)amino]propyl] benzenemethaminium chloride (Chem. Abstracts Reg. No. 122988-32-3). A preferable polymerizable quaternary ammonium salt is 2-[(methacryloyloxy)ethyl] trimethylammonium chloride.

Examples of polymerizable unsaturated sulfonium salts include dialkylsulfonium salts such as [4-ethoxy-3-(ethoxycarbonyl)-2-methylene-4-oxobutyl] dimethylsulfonium bromide (Chem. Abstracts Reg. No. 63810-34-4); and vinylbenzyldialkylsulfonium salts such as vinylbenzyldimethylsulfonium chloride. Examples of polymerizable cyclic sulfonium salts include 1-[4-[(ethenylphenyl)methoxy]phenyl] tetrahydro-2H-thiopyranium chloride (Chem. Abstracts Reg. No. 93926-67-1); and vinylbenzyltetrahydrothiophenonium chloride, which can be prepared by the reaction of vinylbenzyl chloride with tetrahydrothiophene.

Examples of polymerizable phosphonium salts include 2-[(methacryloxy)ethyl] tri-$C_1$–$C_{20}$-alkyl-, aralkyl-, or arylphosphonium salts such as 2-[(methacryloxy)ethyl] tri-n-octadecyl-phosphonium halide (Chem. Abstracts Reg. No. 166740-88-1); tri-$C_1$–$C_{18}$-alkyl-, aralkyl-, or aryl-vinylbenzylphosphonium salts such as trioctyl-3-vinylbenzylphosphonium chloride, trioctyl-4-vinylbenzylphosphonium chloride (Chem. Abstracts Reg. No. 15138-12-4), tributyl-3-vinylbenzylphosphonium chloride, tributyl-4-vinylbenzylphosphonium chloride (Chem. Abstracts Reg. No. 149186-03-8), triphenyl-3-vinylbenzylphosphonium chloride, and triphenyl-4-vinylbenzylphosphonium chloride (Chem. Abstracts Reg. No. 145425-78-1); $C_3$–$C_{18}$-alkenyltrialkyl-, aralkyl-, or aryl-phosphonium salts such as 7-octenyltriphenylphosphonium bromide (Chem. Abstracts Reg. No. 82667-45-6); and tris(hydroxymethyl)-(1-hydroxy-2-propenyl) phosphonium salts (Chem. Abstracts Reg. No. 73082-48-1).

The polymer that contains pendant strong cationic groups and weak acid groups can also be prepared from a monomer that contains both a weak acid group and a strong cationic group. Examples of such monomers include N-(4-carboxy) benzyl-N,N-dimethyl-2-[(2-methyl-1-oxo-2-propenyl)-oxy] ethanaminium chloride and N-(3-sulphopropyl)-N-methacroyloxyethyl-N,N-dimethylammonium betaine.

It is also possible to prepare a polymer that contains strong cationic groups and weak acid groups by adding strong cationic functionality to an already prepared polymer. For example, a polymerizable monomer having a weak acid group can be copolymerized with a polymerizable non-interfering monomer containing an electrophilic group, such as vinylbenzyl halide, to form a polymer having a weak acid group and an electrophilic group. This polymer can then be post-reacted with a nucleophile such as a tertiary amine, pyridine, a dialkyl sulfide, or a cyclic sulfide, which can displace the halide group. This concept is illustrated in the following reaction scheme:

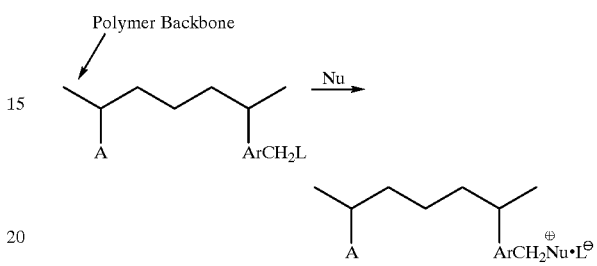

where A is a pendant weak acid group; Ar is an aromatic group, preferably a phenyl group; L is a leaving group, preferably a halide group, more preferably a chloride group; and Nu is the nucleophile that reacts to become the strong cationic group.

In another example of adding strong cationic functionality to an already prepared polymer, a polymer backbone that contains pendant acid groups and a tertiary amine or a sulfide can be post-reacted with an alkylating reagent such as an alkyl halide to form a polymer that contains acid groups and strong cationic groups:

Polymer Backbone where RL is an alkylating reagent.

Examples of non-interfering polymerizable monomers include acrylates such as methyl acrylate, ethyl acrylate, butyl acrylate, 2-hydroxyethyl acrylate, 2-hydroxypropyl acrylate, and allyl acrylate; methacrylates such as methyl methacrylate, ethyl methacrylate, butyl methacrylate, allyl methacrylate, 2-hydroxyethyl methacrylate, polypropylene glycol monomethacrylate, and 2-hydroxypropyl methacrylate; alkenyl aromatic hydrocarbons such as 4-methacryloxy-2-hydroxybenzophenone, 2-(2'-hydroxy-5-methacrylyloxyethylphenyl)-2H-benzotriazole; and $C_1$–$C_4$ alkyl- or alkenyl-substituted styrenes, preferably styrene, α-methylstyrene, vinyltoluene, and vinylbenzyl chloride. Other examples of non-interfering species include $C_3$–$C_{18}$-perfluoroalkyl methacrylates such as 2-(perfluorooctyl)ethyl methacrylate; $C_3$–$C_{18}$-perfluoroalkyl acrylates such as 2-[ethyl[(heptadecafluorooctyl)-sulfonyl]amino]-ethyl 2-propenoate; and $C_3$–$C_{18}$-perfluoroalkyl vinylbenzenes. (See U.S. Pat. No. 4,929,666, column 4, lines 54 to 68, and column 5, lines 1 to 30.)

The mole:mole ratio of the pendant weak acid groups to the strong cationic groups is sufficient to render the polymer soluble or dispersible in a solvent containing a volatile base such as ammonia or a volatile amine. Preferably, the ratio of pendant weak acid groups to pendant strong cationic groups is not less than about 1, more preferably not less than about 2, and most preferably not less than about 4; and preferably not greater than about 100, more preferably not greater than about 50, and most preferably not greater than about 20.

The ratio of the structural units formed from the polymerization of the polymerizable non-interfering monomer to the sum of the structural units formed from the polymerization of the polymerizable weak acid monomer and the polymerizable strong cationic polymer varies depending on the percent solids of the composition and the application, but is preferably not less than about 40:60, more preferably not less than about 60:40, and most preferably not less than about 75:25; and preferably not greater than about 99:1, more preferably not greater than about 98:2, and most preferably not greater than about 95:5.

Typically, the polymer has a number average molecular weight in the range of from about 1000 to about 200,000 Daltons, preferably from about 8000 to about 50,000 Daltons.

In addition to water, the water-based solvent may also include water-compatible solvents, such as a low-boiling polar organic solvent, and/or a high-boiling solvent having a boiling point in the range of from about 135° C. to about 250° C. The low-boiling organic solvent preferably has a Hansen-based hydrogen bonding solubility parameter of from about 6.4 to about 10.5 cal/cm$^3$, and the high-boiling solvent preferably has a Hansen-based hydrogen bonding solubility parameter of from about 1 to about 6.2 cal/cm$^3$. Hansen-based solubility parameters are described in *Ind. Eng. Chem. Proc. Dev.*, Vol. 24, pg. 473 (1985), and in *J. Paint Technol.*, Vol. 39, pg. 505 (1967). Hydrogen bonding solubility parameter ($\delta_h$) relates to the nonpolar solubility parameter ($\delta_n$), and the polar solubility parameter ($\delta_p$) in the following manner:

$$\delta_h = (\delta_t^2 - \delta_n^2 - \delta_p^2)$$

and can be readily determined by one of ordinary skill in the art.

A preferred low-boiling polar organic solvent is characterized by having at least one hydroxyl group, by being soluble in water in all proportions, and by having a boiling point in the range of from about 62° C. to about 134° C. Examples of preferred low-boiling organic solvents include ethanol, 1-propanol, 2-propanol, 2-methyl-2-propanol, 2-methyl-1-propanol, 1-butanol, and propylene glycol methyl ether. Preferably, the composition contains not more than 60 weight percent of the low-boiling polar organic solvent, based on the total weight of solvents and the polymer.

A preferred high-boiling solvent is characterized by having a boiling point in the range of from about 135° C. to about 250° C. Examples of preferred high-boiling solvents include benzonitrile, dimethyl succinate, dimethyl glutarate, dimethyl adipate, dipropylene glycol dimethyl ether, propylene glycol n-butyl ether, dipropylene glycol n-butyl ether, dipropylene glycol n-propyl ether, propylene glycol methyl ether acetate, dipropylene glycol dimethyl ether, dimethyl formamide, dimethylsulfoxide, propylene carbonate, N-methyl-2-pyrrolidone, ethylene glycol phenyl ether, diethylene glycol methyl ether, diethylene glycol n-butyl ether, ethylene glycol n-butyl ether, propylene glycol n-propyl ether, propylene glycol phenyl ether, dipropylene glycol methyl ether acetate, tripropylene glycol methyl ether, dipropylene glycol methyl ether and propylene carbonate.

The composition preferably contains not less than about 4 weight percent and not greater than about 20 weight percent of the high-boiling solvent based on the total weight of solvents and the polymer.

The amount of polymer contained in the composition depends on a variety of factors, including the nature of the monomers used to prepared the polymer, the solvents employed, as well as the end-use application. The amount of polymer is preferably not less than 0.5, more preferably not less than 2, and most preferably not less than 5; and preferably not more than 50, more preferably not more than 25.

The polymer can be prepared by any suitable means, but is preferably prepared as a solution in the presence of a water-containing medium in which the polymer is soluble, such as water and 1-propanol. The polymer can be isolated in the counterion form or as the inner salt as illustrated by the following formulas:

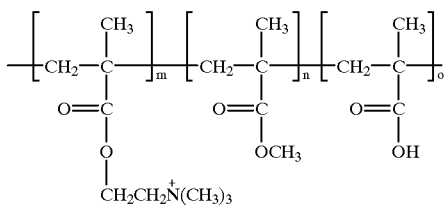

Counterion Form

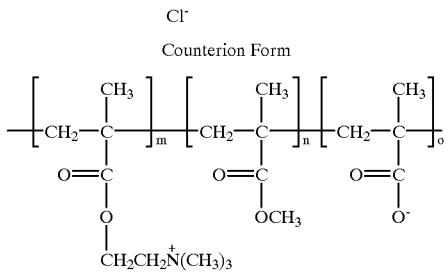

Inner Salt where m, n, and o are integers. The inner salt can be isolated by precipitating the solution containing the polymer with an aqueous base such as aqueous sodium hydroxide or sodium carbonate.

The composition containing the polymer having a backbone containing strong cationic groups and the ammonium salt of weak acid groups can be prepared by contacting the inner salt or counterion of the polymer with a sufficient amount of an amine or ammonia to form an ammonium salt (the conjugate base) of at least a portion of, and preferably substantially all of, the weak acid groups. Examples of suitable amines include ethylenediamine, dimethylaminoethanol, diethylaminomethanol, monoethanolamine, diethanolamine, and triethanolamine. Ammonia is the preferred reagent for forming the ammonium salt.

A solution containing the polyvalent metal complexing agent can be conveniently contacted with a dispersion of the conjugate base to form the composition of the present invention. Examples of suitable polyvalent metal complexing agents include carbonate, acetate, acrylate, and maleate; and aminoacetate salts of calcium, magnesium, zinc, barium, aluminum, zirconium, nickel, iron, cadmium, strontium, bismuth, beryllium, cobalt, lead, copper, and antimony. Preferred polyvalent metals include salts of calcium, zinc, and aluminum, with salts of zinc being more preferred, and zinc acetate being most preferred.

It is also possible to prepare the composition of the present invention by contacting a solution containing the polymer having a backbone containing pendant strong cationic groups and weak acid groups with a solution containing a polyvalent metal complex, which is formed by mixing the polyvalent metal complexing agent with the ammonia or amine. It is preferred to form the composition of the present invention by contacting a solution containing the conjugate base with a solution of the polyvalent metal complex.

Examples of polyvalent metal complexes include zinc carbonate ammonia, calcium carbonate ammonia, zinc acetate ammonia, zinc acrylate ammonia, zinc maleate ammonia, zirconium maleate ammonia, and zinc aminoacetate ammonia. Zinc acetate ammonia is a more preferred complex.

The composition of the present invention can be made into coatings that are fast dry-to-the-touch and exhibit resistance to water as well as a variety of organic solvents. If desired, these coatings may be removed using aqueous cleaning agents containing organic solvents and amines or ammonia.

Such coatings can be used, for example, to coat or protect floors, automobile parts, countertops, wood, furniture, and the interiors or exteriors of houses. The compositions may also include additives such as surfactants, slipping agents, leveling agents, pigments, dyes, fungicides, or bacteriacides.

The following examples are for illustrative purposes only and are not intended to limit the scope of this invention. All percentages are by weight unless otherwise noted.

EXAMPLE 1

Preparation of a Polymer in a Water-based Solvent, Ammonia, and Zinc Acetate, and Coatings Therefrom Four liquid streams are simultaneously and continuously added to a reaction vessel maintained with stirring at 60° C. under nitrogen, and containing water (60 g) and 1-propanol (60 g). The streams are added over a 5-hour period using 100-mL syringes driven by a Sage Instruments syringe pump Model 355 (Cole-Palmer Instrument Company). An additional shot of 1-propanol (90 g) and water (90 g) is also added during this time. After the addition is complete, the reaction is maintained at 60° C. for an additional hour. The reagents and their amounts are shown in Table 1.

TABLE 1

| Stream No. | Component | Amount g (mole percent) |
|---|---|---|
| 1 | Methyl Methacrylate | 166 g (82.9) |
|   | Acrylic Acid | 17.2 g (11.9) |
| 2 | M-Quat[a] | 16.6 g, 12.4 g active (3.0) |
|   | Water | 90 g |
| 3 | Polypropylene Glycol Monomethacrylate | 17.8 g (2.2) |
| 4 | VAZO ™ 52[b] | 2.00 g |
|   | 1-Propanol | 90 g |

[a]2-[(methacryloyloxy)ethyl] trimethylammonium chloride obtained as a 74 percent aqueous solution from Bimax Inc., 717 Chesapeake Ave., Baltimore, MD 21225
[b]2,2'-azobis(2,4-dimethylpentane nitrile) obtained from E. I. du Pont de Nemours & Co., Inc.

The polymer solution is cooled and removed from the reactor, then precipitated in a 0.1M aqueous solution of sodium carbonate. A solid polymer is collected and washed several times with water. A portion of the dried polymer (1 g) is dissolved in a solution of propylene glycol n-butyl ether (0.95 g), propylene carbonate (0.48 g), 1-propanol (4.76 g), water (3.51 g), and aqueous ammonia (28 weight percent, 0.3 g). A solution of zinc acetate is prepared by mixing zinc acetate (1.0 g), aqueous ammonia (28 weight percent, 2.5 g), and water (6.5 g). The crosslinkable formulation is prepared by stirring together a portion of the zinc solution (0.25 g) and a portion of the polymer formulation (5.0 g).

The zinc-containing formulation is applied to a black auto panel by drawing down a thin coating with a KIMWIPES™ EX-L wiper (a trademark of Kimberly-Clark Corp.). The coating is tack-free in less than 4 minutes. After 12 hours, the film properties are tested by wiping the coating with a water-wet cotton swab using an applied pressure of 1500 g. Even after 100 wipes, the coating did not come off the substrate. When the same coating is applied and the film properties are tested by wiping the coating with a 50:50 volume:volume solution of water and isopropanol, the film passed 60 wipes before coming off. The coating is readily removed when wiped with the water/isopropanol solution containing 2 weight percent ammonia.

EXAMPLE 2

The procedure for synthesizing the polymer that was used in Example 1 was repeated except that the initial charge of water and 1-propanol is 30 g of each, a subsequent charge of 45 g of each is added, and the distribution of reagents is as shown in Table 2.

TABLE 2

| Stream No. | Component | Amount g (mole percent) |
|---|---|---|
| 1 | Methyl Methacrylate | 76.1 g (76.0) |
|   | Methacrylic Acid | 17.2 g (20.0) |
| 2 | M-Quat | 11.1 g, 8.3 g active (4.0) |
|   | Water | 45 g |
| 3 | VAZO ™ 52 | 1.00 g |
|   | 1-Propanol | 45 g |

The polymer solution is taken directly from the reactor and dried at ambient conditions overnight, then in an oven at 75° C. for several hours. The solid polymer is crushed and a portion (1.0 g) redissolved in water (9.0 g) and ammonium hydroxide solution (0.24 g of 28 weight percent). Propylene carbonate (1 g) and zinc acetate (0.04 g) were added to the solution with stirring. Coatings are prepared as described in Example 1, and again they were tack-free in 4 minutes. After 12 hours, the film properties are tested by wiping with water-wet cotton swabs using an applied pressure of 1500 g. After 80 wipes, the coating did not come off the substrate. A coating wiped with a solution containing the 50:50 mixture of isopropanol and water is resistant to 20 wipes before off the substrate.

What is claimed is:

1. A composition comprising: a) a polymer having a backbone that contains pendant strong cationic groups and weak acid salt groups; b) a water-based solvent medium; and c) a polyvalent metal complex.

2. The composition of claim 1 wherein the polymer backbone further comprises structural units formed from the polymerization of a polymerizable non-interfering monomer.

3. The composition of claim 2 wherein the polymerizable non-interfering polymerizable monomer is methyl acrylate, ethyl acrylate, butyl acrylate, 2-hydroxyethyl acrylate, 2-hydroxypropyl acrylate, allyl acrylate, methyl methacrylate, ethyl methylacrylate, butyl methacrylate, allyl methacrylate, 2-hydroxyethyl methacrylate, 2-hydroxypropyl methacrylate, or polypropylene glycol monomethacrylate.

4. The composition of claim 2 wherein the pendant weak acid salt groups are formed by the polymerization of acrylic acid, methacrylic acid, itaconic acid, β-carboxyethyl acrylate, or vinylbenzoic acid, followed by reaction with ammonia or an amine.

5. The composition of claim 2 wherein the strong cationic groups are structural units formed by the polymerization of an ethylenically unsaturated quaternary ammonium salt associated with a chloride, bromide, nitrate, phosphate, hydroxide, acetate, or sulfate counterions.

6. The composition of claim 2 wherein the ratio of structural units formed from the polymerization of the polymerizable non-interfering monomer to the strong cationic groups and the acid salt groups is from about 60:40 to about 95:5.

7. The composition of claim 6 wherein the pendant weak acid salt groups are carboxylate groups, the strong cationic groups are quaternary ammonium salts, the structural units formed from the polymerization of the polymerizable non-interfering monomer are methyl methacrylate or butyl methacrylate units, and the ratio of pendant weak acid salt groups to strong cationic groups is not less than 1:1.

8. The composition of claim 7 wherein the polyvalent metal complex is zinc carbonate ammonia, calcium ethylenediamine carbonate ammonia, zinc acetate ammonia, ammonium zinc acrylate, zinc maleate ammonia, zirconium maleate ammonia, or zinc aminoacetate ammonia.

9. The composition of claim 8 wherein the polyvalent metal complex is zinc acetate ammonia.

10. The composition of claim 9 wherein the ratio of pendant weak acid salt groups to strong cationic groups is not less than 2:1.

11. The composition of claim 10 wherein the water-based solvent medium contains a polar organic solvent containing at least one hydroxy group and having a boiling point in the range of 62° C. to about 134° C., or a high boiling solvent having a boiling point in the range of 135° C. to 250° C., or a combination of both.

12. The composition of claim 10 wherein the water-based solvent medium contains ethanol, 1-propanol, 2-propanol, propylene glycol n-butyl ether, or propylene carbonate, or a mixture thereof.

13. The composition of claim 10 wherein the water-based solvent medium contains not less than 4 weight percent and not more than 20 weight percent of the high boiling solvent, based on the total weight of solvents.

14. The composition of claim 13 wherein the water-based solvent medium contains propylene carbonate.

15. The composition of claim 14 wherein the water-based solvent medium contains 1-propanol or 2-propanol.

16. A composition prepared by the step comprising dispersing into a water-based solvent medium: a) a polymer having a backbone that contains pendant strong cationic groups and weak acid groups; b) sufficient ammonia or an amine to convert at least a portion of the weak acid groups to salts of a weak acid; and c) a polyvalent metal complexing agent to form a polyvalent metal complex with the ammonia or amine, the amine being sufficiently volatile to spontaneously evaporate when the composition is applied as a coating to a substrate.

17. The composition of claim 16 wherein sufficient amount of ammonia is used to convert substantially all of the weak acid groups to ammonium salts of the weak acid groups.

18. The composition of claim 17 wherein the polyvalent metal complexing agent is an acetate salt, an acrylate salt, or a carbonate salt of calcium, zinc, or aluminum.

19. The composition of claim 18 wherein the polymer backbone further contains structural units formed from the polymerization of a polymerizable non-interfering monomer, the ratio of the structural units formed from the polymerization of the polymerizable non-interfering monomer to the strong cationic groups and the acid salt groups being from about 40:60 to about 95:5, wherein strong cationic groups are quaternary ammonium groups, the weak acid groups are carboxylic acid groups, and the non-interfering monomer is a methacrylate or an acrylate, or a combination of both.

20. The composition of claim 19 wherein the polyvalent metal complexing agent is zinc acetate.

21. The composition of claim 19 wherein the water-based solvent medium contains ethanol, 1-propanol, 2-propanol, propylene glycol n-butyl ether, or propylene carbonate, or a mixture thereof.

22. The composition of claim 19 wherein the water-based solvent medium contains not less than 4 weight percent and not more than 20 weight percent of the high boiling solvent, based on the total weight of solvents.

23. The composition of claim 20 wherein the water-based solvent medium contains propylene carbonate.

24. The composition of claim 14 wherein the water-based solvent medium contains 1-propanol or 2-propanol.

* * * * *